(No Model.)
E. M. & C. M. KIMBALL
MOTOR.
No. 291,522.          Patented Jan. 8, 1884.
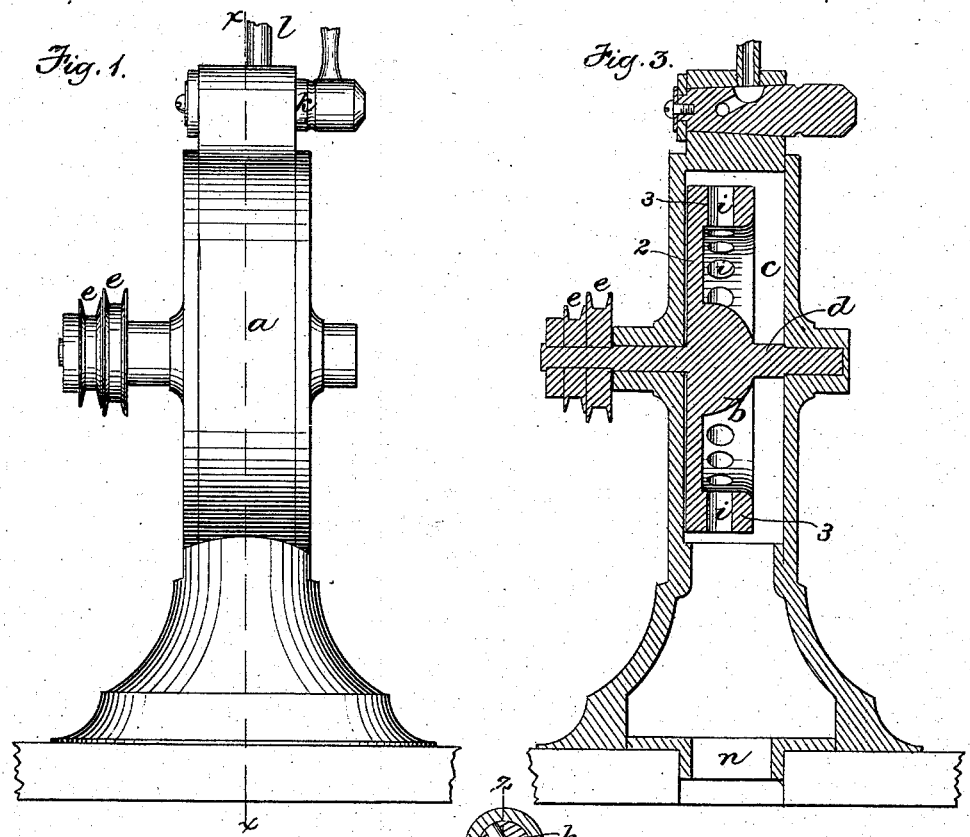
Witnesses:
John M. Inskay
A. L. White
Inventors.
E. M. Kimball
C. M. Kimball
by Wright & Brown
Attys.

UNITED STATES PATENT OFFICE.

EPHRAIM M. KIMBALL AND CHARLES M. KIMBALL, OF TOLEDO, OHIO.

MOTOR.

SPECIFICATION forming part of Letters Patent No. 291,522, dated January 8, 1884.

Application filed April 27, 1883. (No model.)

*To all whom it may concern:*

Be it known that we, EPHRAIM M. KIMBALL and CHARLES M. KIMBALL, of Toledo, in the county of Lucas and State of Ohio, have invented certain Improvements in Motors, of which the following is a specification.

This invention has for its object to provide a simple and efficient motor adapted to be operated by steam, air, water, or other power, and also to be used with suitable indicating or registering mechanism as a meter.

The invention consists in the improved motor composed of a wheel having peculiarly-constructed buckets and a casing provided with a valve and two induction-ports, whereby the water or other power may be directed against the wheel in either of two directions, all of which we will now proceed to describe.

In the accompanying drawings, forming a part of this specification, Figure 1 represents a side elevation of the casing of a motor embodying our improvements. Fig. 2 represents a section on line *x x*, Fig. 1. Fig. 3 represents a section on line *z z*, Fig. 2.

The same letters of reference indicate the same parts in all the figures.

In the drawings, *a* represents the casing, and *b* the wheel, of our improved motor, the wheel being located in a chamber, *c*, in the casing, and having an arbor, *d*, which is journaled in bearings on the casing, and is provided with one or more pulleys, *e*, for the transmission of power. The wheel *b* is composed of a body or plate, 2, which is secured to or formed in the arbor *d*, and a peripheral flange, 3, concentric with the arbor. In the flange 3 are cylindrical orifices *i*, passing through said flange from its inner to its outer surface, and substantially radial with the arbor. The walls of said orifices constitute the buckets of the wheel. In the casing *a* are two ports or tubes, *g g*, for the admission of water or other fluid into the chamber of the casing for the purpose of rotating the wheel. Said tubes enter the casing at different inclinations, one being adapted to direct a stream of fluid against the wheel, so as to rotate the latter in one direction and the other in the opposite direction.

*k* represents a valve in the casing adapted to direct the fluid entering through the supply-pipe *l* into either of the ports or tubes *g*, and at the same time shut off the other tube or port, or to shut off both tubes at the same time. The tubes *g g* are nearly tangential to the periphery of the wheel, their arrangement being such that the streams of fluid issuing from said tubes will be substantially at right angles to the opposing surfaces of the buckets against which said streams abut. The cylindrical form of the buckets and the fact that each is open at both ends, so as to receive the impelling fluid at one end and allow it to escape at the other, enables the force of the fluid to be expended to the best advantage on the buckets, the entire stream of fluid being concentrated upon each bucket, instead of being scattered as in striking a flat surface. The radial arrangement of the buckets adapts the wheel to be rotated in either direction. The two induction tubes or ports and their valve enable the direction of rotation of the wheel *b* to be controlled, as will be readily seen. The casing *a* has an eduction-passage, *n*, for the escape of the fluid.

It will be observed that this improved device is adapted to be used as a motor for light-running machinery, or as a meter, a suitable indicator or register being provided.

We do not limit ourselves to the peculiar construction of the wheel *b* in all cases, the casing, with its differently-arranged induction ports or tubes and its valve, being capable of use with differently-constructed wheels—for instance, an ordinary overshot wheel; nor do we limit ourselves to the use, with the peculiarly-constructed wheel, of the two induction ports or tubes *g g*, as one of said ports may be omitted without departing from the spirit of our invention, so far as the construction of the wheel is concerned.

We claim—

1. A motor composed of an upright casing, two valved induction-ports at the top of said casing, leading in opposite directions, and arranged, as described, so that one shall be closed when the other is open, and a wheel substantially concentric with the casing, having open-ended and curved-faced buckets, as set forth.

2. In a motor or meter, a journaled wheel having a rim or flange concentric with its axis, and having radial orifices with curved bearing-faces passing through said rim and constituting open-ended radial buckets, as set forth.

In testimony whereof we have signed our names to this specification, in the presence of two subscribing witnesses, this 21st day of April, 1883.

EPHRAIM M. KIMBALL.
CHARLES M. KIMBALL.

Witnesses:
EDWARD D. MOORE,
JNO. M. WHEELER.